United States Patent
Caffary, Jr.

(10) Patent No.: US 7,872,772 B2
(45) Date of Patent: Jan. 18, 2011

(54) NETWORK PRINTING TRACKING SYSTEM

(76) Inventor: Robert G. Caffary, Jr., 178 Preston Rd., Jewett City, CT (US) 06351

( * ) Notice: Subject to any disclaimer, the term of this patent is extended or adjusted under 35 U.S.C. 154(b) by 949 days.

(21) Appl. No.: 11/716,988

(22) Filed: Mar. 12, 2007

(65) Prior Publication Data

US 2008/0037057 A1   Feb. 14, 2008

Related U.S. Application Data

(63) Continuation-in-part of application No. 10/156,648, filed on May 29, 2002, now Pat. No. 7,190,478.

(51) Int. Cl.
G06F 15/00 (2006.01)
G06K 9/00 (2006.01)

(52) U.S. Cl. .................................. 358/1.15; 382/100

(58) Field of Classification Search ................ 358/1.15, 358/1.13, 1.14, 1.16, 1.18; 713/2, 188, 176, 713/170, 171; 726/25; 382/100, 303; 709/217, 709/229, 240; 235/375, 487, 470; 345/163; 400/62, 71

See application file for complete search history.

(56) References Cited

U.S. PATENT DOCUMENTS

2008/0292137 A1 * 11/2008 Rhoads ...................... 382/100

* cited by examiner

*Primary Examiner*—Saeid Ebrahimi Dehkordy
(74) *Attorney, Agent, or Firm*—Ober, Kaler, Grimes & Shriver; Royal W. Craig

(57) ABSTRACT

A software system and method for monitoring and tracking print transaction event history for a pipeline users, devices, applications and documents in a network environment. The system employs a substitute print driver that comprises the original OEM Print Driver installed at each client or server PC, and at each target output device, wrapped with installed "agent" software. This agent software combined with the original OEM print driver performs the following functions: 1) monitors document origination, generation, acquisition and destination metrics to and from the network pipeline of User(s) and Device(s) connected to the print server; 2) sends data to a data store which the customer and/or dealer controls, and 3) provides content management functionality of document delivery.

6 Claims, 2 Drawing Sheets

NETWORK PRINTING TRACKING SYSTEM

CROSS-REFERENCE TO RELATED APPLICATIONS

The present application is a continuation-in-part of U.S. Ser. No. 10/156,648 filed 29 May 2002 now U.S. Pat. No. 7,190,478.

BACKGROUND OF THE INVENTION

1. Field of the Invention

The present invention relates to network printer management and, more particularly, to a system for printer management including software that runs from either a client or server computer to monitor and track transaction event history for a pipeline of different users, devices, applications and documents.

2. Description of the Background

The printer market includes computer printer manufacturers such as Hewlett-Packard, Lexmark and Epson, as well as high-end copier manufacturers, such as Xerox and Ricoh. Companies such as Canon maintain a strong presence in both the printer market and the copier market.

These vendors as well as their customers understand the importance of device management including printers, copiers, network fax machines and scanners. Indeed, most large organizations use some form of print management to audit, analyze, track, restrict and quota their employee's printing. This helps them to save significant expense, and indeed as much as 40% or more on their printing expenses alone.

Existing network technology provides limited capability to manage printers and other devices. A primary goal of local area network (LAN) technology is to share all resources that are distributed across the network. Existing network software helps network administrators to accomplish this purpose. For example, Microsoft® Windows NT® Server 4.0 allows administrators to give anyone in their organization access to resources available on a Windows NT Server system. Nevertheless, comprehensive print management in a conventional network is still an elusive goal. This is primarily due to the complexities in managing the diverse operating systems of the client computers, and the numerous printer drivers required for each different type of printer and for each different operating system, and the management problems created by a mixture of end-user attached and network attached printers. Printers that are attached directly to an end-user's computer are not easily installed, configured or removed. In order to install and use a new printer on an end-user's computer, the device driver must be installed from the computer itself, the port must be configured and the device mode settings (such as page size) must be manually set.

There are numerous obstacles faced in central printer management. Within a typical LAN a plurality of client terminals are connected to respective network Servers via any of a number of different communication topologies inclusive of 10-base T, 100-base T, Sonet, Token Ring, etc. Clients terminals might be configured to communicate with their assigned Servers via any of a number of different communication protocols such as IPX/SPX, TCP/IP, etc. In addition, Clients might be running any of various operating systems such as MacIntosh, Windows 95, 98 or Windows NT Workstation. Moreover, any number of different printers may be connected to the LAN, each requiring a different printer driver specially configured depending on the above constraints. If there are 100 client stations each with printers attached, and there are 5 servers, then there would need to be 500 printer configurations defined and maintained. The management of client printer configurations has traditionally been a manual process and all printer drivers must be manually installed and network connections manually established. This is accomplished by the administrator physically working with each client station connected to the LAN, and the impracticality of the situation becomes apparent.

There are a number of prior art references that are generally concerned with printer resource management.

For example, U.S. Pat. No. 5,819,015 to Martin et al. shows a networked system using a host computer that can be utilized by a user or a Network Administrator to "read" the contents of each printer memory connected to the network.

U.S. Pat. No. 5,993,088 to Nogay shows a method for optimal use of print resources during the preparation a print job for printing. During the creation of a spool file the invention logs data on print resource usage (such as font types and frequency) in a print job in an accounting file. Upon review of this data, it modifies the print resource usage data in the accounting file as necessary to optimize print resource usage. The spool file and the accounting file are then sent to a printer driver. The printer driver knows how to use the print resource data in the accounting file to optimize the print resource usage.

U.S. Pat. No. 5,935,262 to Barrett et al. shows a print interface device between a local area network (LAN) and a printer and which can output a log file. The device includes a LAN interface for receiving image forming jobs and command signals from the LAN, and a peripheral interface for outputting image forming jobs to the printer. The network device further includes a storage device that stores a log file of print jobs received from the LAN. The device includes a processor that updates the stored log file based on the image forming jobs received from the LAN. The processor is capable of formatting the log file into a print job and outputting the formatted log file to the printer.

U.S. Pat. No. 6,003,069 to Cavill shows a client/server printer driver system including a client-side subsystem capable of dividing the print job into portions to be processed client-side.

U.S. Pat. No. 5,794,035 to Golub et al. shows a system for managing input/output (I/O) resources in a computer system. The system includes a hardware resource manager which tracks the use of the I/O resources. In addition, the hardware resource manager (HRM) can allocate the resources between device drivers and provide a standard implementation to be used by device drivers. The HRM manages resources, arbitrates requests for print resources, and eliminates bottlenecks.

U.S. Pat. No. 5,699,493 to Davidson et al. shows a printing system having a host computer and a printer in which the printer acquires print job accounting information and communicates it to the host computer via NPAP messages. A host computer downloads print job data to the printer through a communications port on the printer (i.e., either a parallel port, serial port, or network port), and as the printer prints the print job that it received from the host computer, the printer temporarily stores job accounting information. At the end of the print job, the printer communicates that job accounting information back to armed host computers via a bi-directional communications port, including typical information such as: the job identifier number, job processing time, number of sheets of paper from each paper source, number of impressions from each paper source (either one-sided or two-sided impressions), the port identifier, the network user name, the name of the print job (as specified), and the printer's serial number.

U.S. Pat. No. 5,727,135 to Webb et al. shows bidirectional communications between a host computer and a selected printer connected to the host, to provide a user of the host with access to a substantially real-time, visual and functional replica of the operator panel of the selected printer. A user at the host computer may also visually monitor the status of multiple printers at the same time from the same host display.

Although all of the above-referenced patents suggest printer management in a LAN context, they are meant to install a print management program at a central server that intercepts print data from connected devices upstream of the server. Under this topology only limited print information can be attained.

For example, FIG. 1 is a prior art illustration of a conventional scheme in which a client or server PC 10 employs a print driver 20 which in turn outputs to a print spooler 30 which then outputs to either of two multi-function LDAP complaint print devices 40, 50. By monitoring this print stream it is only possible to obtain information about that print job, and not all device and user metrics that may not have been sent with the print job.

None of the prior art suggest the concept of "driver wrapping", e.g, attaching print reporting software (agent software) to the OEM print drivers used in the network whether at client or server PCs, or all, to monitor print requests, extract all relevant print data (including both device and user metrics), and then upload the information to a database repository which can be located on any local or remote data store, or internal or external data store. The print data can then be interrogated from any connected client or server PC or by internet access. This driver wrapping would allow much more comprehensive print and device monitoring from either a client or server computer, and can monitor and track transaction event history for a pipeline of different users, devices, applications and documents. It can monitor all aspects of document origination, generation, acquisition and destination metrics to and from the network pipeline of User(s) and Device(s) connected to a print server before sending data to the internal data store and/or an external data store which the customer and/or vendor controls.

SUMMARY OF THE INVENTION

It is, therefore, an object of the present invention to provide a system and method for capturing user metrics, document metrics, and device metrics with device alerts on all print/copy job output, document delivery and the printer status and events emanating from client or server PC's to the target printer or target output device.

It is another object to capture user metrics, document metrics, and device metrics with alerts for all print/copy job output, document delivery, and printer status and events that come from the target printer or target output device itself.

It is still another object to provide agent software that can interrogate the Application, GDI, Print Driver, Print Spooler, Print Processor, Print Router System, Local Print Providers, Network Print Providers, Language Monitor, Print Data Stream RAW i.e. Postscript or PCL and other OEM print data streams typically used with the Local Print Provider, EMF-enhanced meta formats typically used with the Network Print Providers, Microsoft XPS Vista's new XML Page Specification data stream for higher fidelity printing, Port Monitors, Ports, Operating System and the Device directly from a server or client pc to capture all metrics that may not have been sent with the print job.

According to the present invention, the above-described and other objects are accomplished by providing software system and method that can run from a client or server PC to monitor and track transaction event history on a pipeline users, devices, applications and documents. The system employs a substitute print driver that comprises the original OEM Print Driver installed at each client or server PC, and at each target output device, wrapped with installed "agent" software. This agent software combined with the original OEM print driver performs the following functions: 1) monitors document origination, generation, acquisition and destination metrics to and from the network pipeline of User(s) and Device(s) connected to the print server; 2) sends data to an internal data store and/or an external data store which the customer and/or dealer controls; 3) provides content management functionality of document delivery via rule based scripting language or GUI interface, storage and retrieval with compression of documents and monitors the transaction and event history of document storage and retrieval at the print server as well.

The substitute print driver allows all network access points of user(s), including user metrics and document creation and delivery data to be monitored to and from the various access points on the network i.e Workstations local and remote, laptops, MFP's and other assets that create documents with a user login on the network. Specifically, the substitute print driver can interrogate the Application, GDI, Print Driver, Print Spooler, Print Processor, Print Router System, Local Print Providers, Network Print Providers, Language Monitor, Print Data Stream RAW i.e. Postscript or PCL and other OEM print data streams typically used with the Local Print Provider, EMF-enhanced meta formats typically used with the Network Print Providers, Microsoft XPS Vista's new XML Page Specification data stream for higher fidelity printing, Port Monitors, Ports, the Operating System and all connected devices to capture all metrics, including those that may not have been sent with the print job.

The print information mined by the substitute print driver is automatically uploaded to a database repository which can be located on any local or remote data store, or internal or external data store. This data is then shared with both customer and the dealer/service provider for user and device analysis and the customization of their transaction billing business methodology. The entire system and solution is non intrusive to the network and is a procedural extension of the operating system, and so the substitute print driver is not viewed as a virus. It locks down metrics on Users, Applications, Documents, Delivery, Storage and Compression, and the Device metrics for the customer and their dealers giving ultimate control over the data to the customer. No third part SNMP tools for discovery are required under this system which typically hog network resources i.e. bandwidth and are typically view as malicious threats to the network security. This provides real time accounting for vendors using the system and also provides the vendor with a service database and field employee tracking system. The vendors's control over delivery of service to the customer is greatly improved.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present system is a software system and method that can run from a client or server pc to monitor and track transaction event history on a pipeline users, devices, applications and documents.

Figure 1:
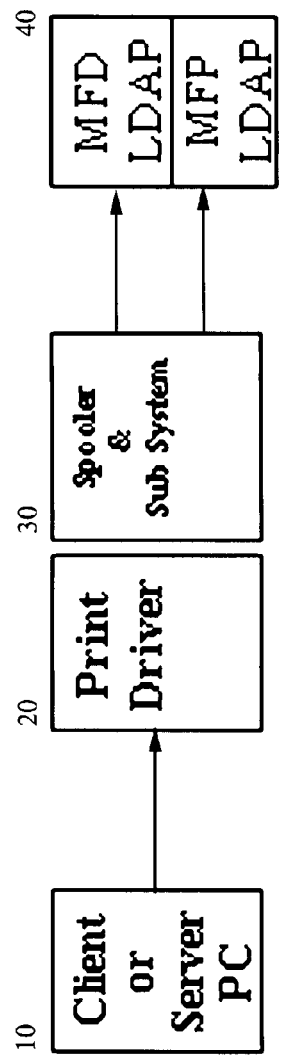
FIG. 1 is a prior art flow diagram illustrating a conventional print job assignment.
Figure 2:
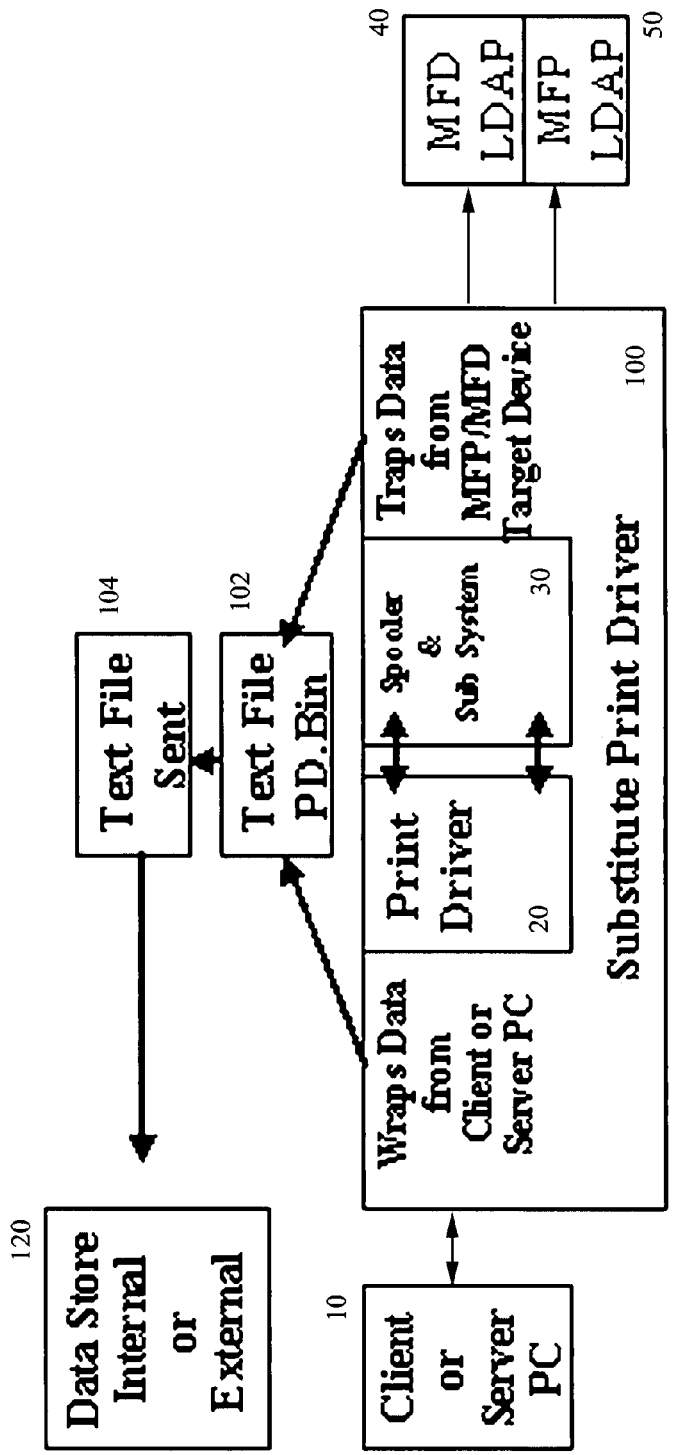
FIG. 2 is a network diagram illustrating the transaction-based print monitoring system according to the present invention.

FIG. 2 is a network diagram illustrating the transaction-based print monitoring system according to the present invention. In accordance with the present invention, the system employs a substitute print driver 100 that comprises the original OEM Print Driver 20 (as in FIG. 1) installed at each client or server PC 10, as well as at each target output device, wrapped with installed "agent" software. This agent software supplements the original OEM print driver 20 and performs the following functions: 1) it monitors document origination, generation, acquisition and destination metrics to and from the network pipeline of User(s) and Device(s) connected to the print server 10; 2) sends print data as a text file to a data store 120 which may be an internal data store and/or an external data store which the customer and/or dealer controls; 3) it provides content management functionality of document delivery via rule based scripting language or GUI interface, storage and retrieval with compression of documents and monitors the transaction and event history of document storage and retrieval at the print server 10 as well.

Generally, this substitute print driver 100 captures a full set of User, Document and Device metrics with Alerts. Specifically, substitute print driver 100 captures the following:

1. User metrics, document metrics, and device metrics with device alerts on all print/copy job output, document delivery and the printer 40, 50 status and events that come from remote client or server 10 PC's to the target printer or target Output Device (40 or 50).

2. All user metrics, document metrics, and device metrics with alerts for all print/copy job output, document delivery, and printer status and events that come from the target printer or target Output Device, even if a user were to walks up to one of the target MFP's 40, 50 and log in and then scan, copy or print documents.

3. substitute print driver 100 also interrogates the Application, GDI, Print Driver, Print Spooler, Print Processor, Print Router System, Local Print Providers, Network Print Providers, Language Monitor, Print Data Stream RAW i.e. Postscript or PCL and other OEM print data streams typically used with the Local Print Provider, EMF-enhanced meta formats typically used with the Network Print Providers, Microsoft XPS Vista's new XML Page Specification data stream for higher fidelity printing, Port Monitors, Ports, Operating System and the Device directly from a server or client pc to capture all metrics that may not have been sent with the print job.

One skilled in the art should understand that the target printer may be other than MFPs 40, 50, but may include any number of traditional black/white or color printers, copiers, scanners, MFP printers or other MFD Multi Function Devices that can print scan, copy, fax, or email. It is envisioned that any network capable device can be connected including stereo lithography machines, X-ray devices, plotters, three dimensional printers, rapid prototyping devices or any other target output device asset. Target printers or other target output devices are typically identified by the networks MAC address or serial number from the device management information block (MIB) which are read by the substitute print driver 100. In some cases a unique identification may not be available from the target printer or network MAC address. For example, if the target printer is connected to the client or server PC 100 or through a network print server device using a USB, Serial, Parallel, Blue Tooth, IRD, or similar interfaces the substitute print driver 100 will assign a unique identification to the target printer.

In all such cases the substitute print driver 100 allows all network access points of user(s), including user metrics and document creation and delivery data to be monitored to and from the various access points on the network i.e workstations (local and remote), laptops, multi-function device (MFP's) and other assets that create documents with a user login on the network.

As seen in FIG. 2, the monitored print information comprises all User, Document and Device metrics with Alerts, and this information is stored locally in an encrypted text file i.e. PD.bin 102. This encrypted information resides temporally on any hard drive assigned by the substitute print driver 100, or on a default drive. The encrypted text file 102 is periodically and automatically uploaded as at 104 to a database repository 120 which can be located on any local or remote data store, or internal or external data store. At this point the uploaded data in data store 120 can be shared with both customer and the dealer/service provider for user and device analysis and the customization of their transaction billing business methodology.

The entire system and solution is non intrusive to the network and is a procedural extension of the operating system, and so the substitute print driver is not viewed as a virus. The substitute print driver software may be installed by the network administrator on the necessary client or server PCs 100, and is constructed and deployed to authenticate itself to avoid operating security breaches. This allows installation while maintaining the security context of the operating system and the enterprises security policies.

Figure 3:
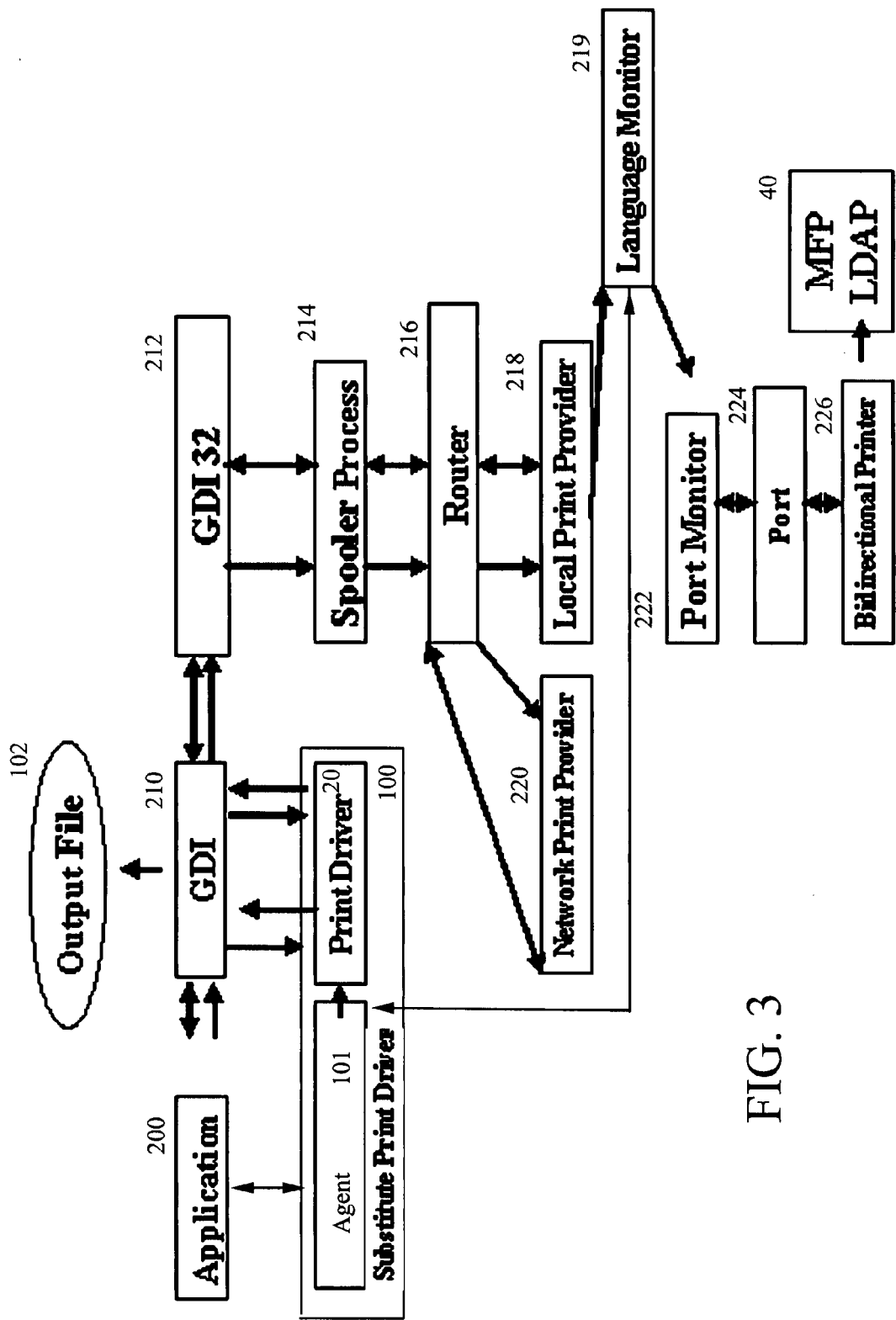
FIG. 3 is a more detailed network diagram illustrating the operation of the print monitoring system during a particular transaction according to the present invention.

FIG. 3 is a more detailed network diagram illustrating the operation of the print monitoring system during a particular transaction according to the present invention. As described above, at installation agent software 101 is attached to the original OEM Print Driver 20 at each client or server PC to form the substitute print driver 100. This is herein defined as wrapping the print driver 100 with the installed agent software 101. The agent software 101 supplements the original OEM print driver 20 and performs the above-described functions, monitoring all document origination, generation, acquisition and destination metrics to and from the entire network of User(s) and Device(s).

When a user prints from a software application 200, to a network printer, a journal file (List of DDI calls) is produced by the Graphics Device Interface (GDI) 210 of the client computer. The journal file is sent to the print spooler component 240. Also, if the requesting computer does not have a print driver for the print device or its print driver is older than the print driver on the print server, it will receive a copy of the print driver 20 from the print server. The journal file is converted to a RAW print file by the print processor for the specific print device 40 the print job is being sent to. The RAW file is a file converted from device driver interface or DDI calls to commands specific for the print device 40 the job is being sent to, by the OEM print driver (now wrapped)

which translates these DDI calls into commands for the specific print device. The GDI 210 passes the print request to 32-bit GDI 212 (because the Windows spooler process is 32-bit code). The GDI32 212 then makes an interprocess call to the spooler process 214 (SPOOL32.EXE), which calls the router 216 to route the print job to the printer 40 specified by the application. In this example, the router 216 calls the local print provider with the print job and sends the print job to the local print provider 218. Note that the router 216 could send the job to a printer on the network through the network print provider 220. The default Windows™ spooler spools the network print job locally to a local spooler (Port Monitor 222), which then prints the job through Port 224 and out to bi-directional printer 226 which is here multi-function device MFP 40. The language monitor (LM) 219 is an optional (known) spooler component that allows print-time interaction with printer 40. The main function of the language monitor 219 is to monitor printer status, such that a user can request configuration and status from the printer 40.

Moving back to the substitute print driver 100, it interrogates all the Application 200, GDI 210, and OEM Print Driver 20, as well as the optional language monitor (LM) 219 to capture all metrics that may or may not have been sent with the print job. This way, the substitute print driver 100 allows all network access points of user(s), including user metrics and document creation and delivery data to be monitored to and from the various access points on the network i.e workstations (local and remote), laptops, multi-function device (MFP's) and other assets that create documents with a user login on the network. The monitored print information comprises all User, Document and Device metrics with Alerts, and as described with respect to FIG. 2 this information is stored locally in an encrypted text file i.e. PD.bin 102.

At least the following data is captured by the substitute print driver 100 and is stored in the encrypted text file i.e. PD.bin 102:
PrinterName
MachineName
DriverName
Location
UserLogon
MachineName
DocumentName
DataType
Copies
FileSize
Submitted
PagesPrinted In addition, the following data may be captured
Orientation
Paper Size
Paper Length
Paper Width
Scale
Print Quality
Yresolution
Color
Duplex
TTOption This encrypted information resides temporally on any hard drive assigned by the substitute print driver 100, or on a default drive. The encrypted text file 102 is periodically and automatically uploaded as at 104 to a database repository 120 which can be located on any local or remote data store, or internal or external data store. At this point the uploaded data in data store 120 can be shared with both customer and the dealer/service provider for user and device analysis and the customization of their transaction billing business methodology.

Given the foregoing data collected from all the Client PCs, a user can access the datastore 120 locally, remotely or by web access and generate a variety of reports.

It should now be apparent the above-described system locks down metrics on Users, Applications, Documents, Delivery, Storage and Compression, and the Device metrics for the customer and their dealers giving ultimate control over the data to the customer. No third party SNMP tools for discovery are required under this system which typically hog network resources i.e. bandwidth and are typically view as malicious threats to the network security. This provides real time accounting for vendors using the system and also provides the vendor with a service database and field employee tracking system. The vendors's control over delivery of service to the customer is greatly improved.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method for managing network printers in a network including a print server having at least one existing print driver, a plurality of client terminals, and at least one printer, comprising the steps of:
    creating a substitute print driver on said print server, said substitute print driver including said existing print driver and appended printer management agent software for monitoring document, user and device metrics, inclusive of origination, generation, acquisition and destination metrics, to and from said at least one printer;
    capturing said document, user and device metrics by said substitute print driver each time a print job is printed to said at least one printer;
    storing said captured document, user and device metrics in an encrypted file locally;
    periodically writing said encrypted document, user and device metrics from said local file to a central data store;
    accessing said central data store and assessing said document, user and device metrics.

2. The method for managing network printers in a network according to claim 1, wherein said document, user and device metrics comprise at least the following: PrinterName, MachineName, DriverName, Location, UserLogon, MachineName, DocumentName, DataType, Copies, FileSize, Submitted, and PagesPrinted.

3. The method for managing network printers in a network according to claim 1, wherein said document, user and device metrics comprise any one from among the following fields: Orientation, Paper Size, Paper Length, Paper Width, Scale, Print Quality, Yresolution, Color, Duplex, TTOption.

4. A method for managing network printers in a network including a print server having at least one existing print driver, a plurality of client terminals, and at least one printer, comprising the steps of:
    appending printer management agent software to the existing print driver on said print server for monitoring document, user and device metrics, inclusive of origination, generation, acquisition and destination metrics, to and from said at least one printer;

capturing said document, user and device metrics by said printer management agent software each time a print job is printed to said at least one printer;

storing said captured document, user and device metrics in an encrypted file locally;

periodically writing said encrypted document, user and device metrics from said local file to a central data store;

accessing said central data store and assessing said document, user and device metrics.

5. The method for managing network printers in a network according to claim 4, wherein said document, user and device metrics comprise at least the following: PrinterName, MachineName, DriverName, Location, UserLogon, MachineName, DocumentName, DataType, Copies, FileSize, Submitted, and PagesPrinted.

6. The method for managing network printers in a network according to claim 4, wherein said document, user and device metrics comprise any one from among the following fields: Orientation, Paper Size, Paper Length, Paper Width, Scale, Print Quality, Yresolution, Color, Duplex, TTOption.

* * * * *